(12) United States Patent
Kim

(10) Patent No.: US 10,708,968 B2
(45) Date of Patent: Jul. 7, 2020

(54) METHOD OF CONTROLLING MOBILITY OF UE AND APPARATUS THEREFOR

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/112,619

(22) Filed: Aug. 24, 2018

(65) Prior Publication Data

US 2019/0069333 A1     Feb. 28, 2019

(30) Foreign Application Priority Data

Aug. 25, 2017 (KR) .................. 10-2017-0107962
Jul. 30, 2018 (KR) .................. 10-2018-0088414

(51) Int. Cl.
| | |
|---|---|
| H04W 76/15 | (2018.01) |
| H04W 76/27 | (2018.01) |
| H04W 76/30 | (2018.01) |
| H04W 76/12 | (2018.01) |
| H04W 76/11 | (2018.01) |
| H04W 24/10 | (2009.01) |
| H04W 36/00 | (2009.01) |
| H04W 88/08 | (2009.01) |

(52) U.S. Cl.
CPC .......... *H04W 76/15* (2018.02); *H04W 24/10* (2013.01); *H04W 36/0033* (2013.01); *H04W 76/12* (2018.02); *H04W 76/27* (2018.02); *H04W 76/30* (2018.02); *H04W 76/11* (2018.02); *H04W 88/085* (2013.01)

(58) Field of Classification Search
CPC combination set(s) only.
See application file for complete search history.

(56) References Cited

U.S. PATENT DOCUMENTS

| | | | |
|---|---|---|---|
| 2017/0202033 | A1* | 7/2017 | Lee ..................... H04W 8/22 |
| 2018/0035420 | A1* | 2/2018 | Centonza ............ H04W 72/048 |
| 2018/0132129 | A1* | 5/2018 | Sitomaniemi ..... H04W 28/0263 |
| 2018/0302878 | A1* | 10/2018 | Byun .................... H04W 68/02 |

(Continued)

OTHER PUBLICATIONS

Samsung et al., "Intra-CU/Inter-DU mobility and lost packet retransmission", R3-172956, 3GPP TSG-RAN WG3 Meeting #97, Berlin, Germany, Aug. 21-25, 2017.

(Continued)

*Primary Examiner* — Yee F Lam
(74) *Attorney, Agent, or Firm* — IP Legal Services, LLC

(57) ABSTRACT

Provided are a method and a base station for controlling mobility of UE. The method may include receiving, by a CU, a measurement report from a UE through a DU; sending, by the CU, a UE context setup request message to a target DU to create a UE context and set a bearer up; sending, by the target DU, a UE context setup response message to the CU to inform the CU of completion of creating the UE context and setting up a bearer; sending, by the CU, a UE context modification request message including a RRC connection reconfiguration message to the source DU; performing, by the target DU, a random access procedure with the UE; and forwarding, by the target DU, an RRC connection reconfiguration complete message received from the UE to the CU.

18 Claims, 13 Drawing Sheets

(56) References Cited

U.S. PATENT DOCUMENTS

| | | | | |
|---|---|---|---|---|
| 2018/0332516 A1* | 11/2018 | Oak | .................... | H04W 36/08 |
| 2018/0337846 A1* | 11/2018 | Lee | .................... | H04W 28/085 |
| 2018/0352482 A1* | 12/2018 | Gage | ................ | H04W 36/0011 |
| 2018/0368205 A1* | 12/2018 | Park | .................... | H04L 5/0048 |
| 2019/0037448 A1* | 1/2019 | Shan | ................ | H04W 36/0016 |
| 2019/0069333 A1* | 2/2019 | Kim | .................... | H04W 76/15 |
| 2019/0098624 A1* | 3/2019 | Vaidya | ................ | H04W 36/38 |
| 2019/0174391 A1* | 6/2019 | Ode | .................... | H04W 76/27 |

OTHER PUBLICATIONS

Vodafone Group, "Inter DU Mobility", R3-172669, 3GPP TSG-RAN WG3 97, Berlin, Germany, Aug. 21-25, 2017, pp. 1-7.
Huawei, "Discussions on Introduction of UE pair ID over F1", R3-173130, 3GPP TSG-RAN3 Meeting # 97, Berlin, Germany, Aug. 21-25, 2017.

* cited by examiner

METHOD OF CONTROLLING MOBILITY OF UE AND APPARATUS THEREFOR

CROSS REFERENCE TO RELATED APPLICATION

This application claims priority from Korean Patent Application Nos. 10-2017-0107962 & 10-2018-0088414, filed on Aug. 25, 2017 & Jul. 30, 2018, which are hereby incorporated by reference for all purposes as if fully set forth herein.

BACKGROUND OF THE INVENTION

1. Field of the Invention

The present disclosure relates to a technology for controlling mobility of user equipment (UE) in a network which uses the next-generation radio access technology, and more particularly, to a technology for allowing a base station (a 5G base station or a new radio (NR) base station), which is configured to use the next-generation radio access technology, to maintain seamless data transmission/reception operations according to movement of the UE.

2. Description of the Prior Art

In the typical wireless access technology (e.g., $4^{th}$ generation (4G) or long term evolution (LTE) technology), when a connection to a base station from a terminal is changed to another base station as the terminal moves, a terminal mobility control operation between the base stations is performed through an X2 or S1 interface.

Meanwhile, it has become essential to provide mobility as the next-generation radio access technology (5G) is newly applied to the network. In particular, when a 5G base station uses a mmWave frequency (e.g., 28 GHz) in a high frequency band, the coverage of the 5G base station is expected to become smaller due to the characteristics of the mmWave frequency. Therefore, in this case, mobility control operations of the terminal are likely to occur frequently.

In addition, when a next-generation radio access technology is applied to a base station, a plurality of small-cell base stations need to be established in order to use a high-band frequency and meet the high-speed transmission rate and high reliability requirements. In this regards, many researches have been conducted for splitting the inside of the base station into a plurality of node (unit) devices and interfaces between nodes. However, for device compatibility of each node, the interface should be constructed in a standard-based open architecture type.

For such a split structure of the next-generation base station, it is necessary to define a protocol for controlling mobility of a terminal between different distributed units in the same base station.

SUMMARY OF THE INVENTION

The present disclosure is to provide a technology of controlling mobility of a user equipment (UE) according to change of a distributed unit (DU) in a next generation base station having a split structure.

In addition, the present disclosure is to provide a procedure for changing a unit in a base station according to control of mobility of a UE even when a central unit (CU) is logically split into a plurality of units in order to control each of a control signal and a data signal.

To solve the foregoing problem, in accordance with an embodiment, a method of a base station may be provided for controlling mobility of user equipment (UE). The method may include receiving, by a central unit (CU), a measurement report from a UE through a source distributed unit (DU), sending, by the CU, a UE context setup request message to a target DU to create a UE context and set a bearer up when control of mobility of the UE is determined according to the measurement report, sending, by the target DU, a UE context setup response message to the CU to inform the CU of completion of creating the UE context and offsetting up a bearer, sending, by the CU, a UE context modification request message including a radio resource control (RRC) connection reconfiguration message to the source DU, performing, by the target DU, a random access procedure with the UE, and forwarding, by the target DU, an RRC connection reconfiguration complete message received from the UE to the CU.

In accordance with another embodiment, a base station may be provided for controlling mobility of user equipment (UE). The base station may include a receiver configured to receive a measurement report from a UE through a source distributed unit (DU), a controller configured to, when control of mobility of the UE is determined according to the measurement report, control a central unit (CU) to send a UE context setup request message to a target DU to create a UE context and set a bearer up, control the target DU to send a UE context setup response message to the CU to inform the CU of completion of creating a UE context and offsetting up a bearer, and control the CU to send a UE context modification request message including a radio resource control (RRC) connection reconfiguration message to the source DU, and a transmitter configured to send the RRC connection reconfiguration message to the UE through the source DU, wherein the target DU performs a random access procedure with the UE and forwards an RRC connection reconfiguration complete message received from the UE to the CU.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
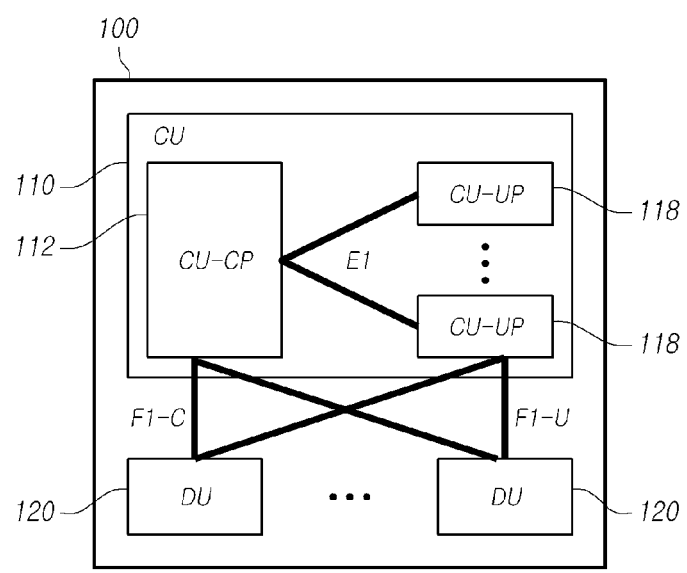
FIG. 1 is a view illustrating an exemplary internal configuration of a base station and an interworking interface in accordance with an embodiment.

Hereinafter, embodiments of the present disclosure will be described in detail with reference to the accompanying drawings. In adding reference numerals to elements in each drawing, the same elements will be designated by the same reference numerals, if possible, although the elements are shown in different drawings. Further, in the following description of the present disclosure, a detailed description of known functions and configurations incorporated herein will be omitted when it is determined that the description may make the subject matter of the present disclosure rather unclear.

As used herein, a wireless communication system may mean a system for providing various communication services such as a voice service and a packet data service. The wireless communication system may include user equipment (UE) and a base station (BS).

The UE may be a comprehensive concept that indicates a terminal for use in wireless communication, including a UE in wideband code division multiple access (WCDMA), long term evolution (LTE), high speed packet access (HSPA), international mobile telecommunication (IMT)-2020 (5G or New Radio (RN)), and the like, and a mobile station (MS), a user terminal (UT), a subscriber station (SS), a wireless device, and the like in Global System for Mobile communications (GSM).

A base station or a cell may generally refer to a station where communication with a UE is performed. The base station or the cell means, inclusively, all of various coverage areas such as a Node-B, an evolved Node-B (eNB), gNode-B (gNB), low power node (LPN), a sector, a site, various types of antennas, a base transceiver system (BTS), an access point, a point (e.g., transmitting point, receiving point, or transceiving point), a relay node, a megacell, a macrocell, a microcell, a picocell, a femtocell, a remote radio head (RRH), a radio unit (RU), and a small cell.

Each of the above-mentioned various cells has a base station that controls a corresponding cell. Thus, the base station may be construed in two ways. 1) The base station may be a device that provides a megacell, a macrocell, a microcell, a picocell, a femtocell, and a small cell in association with a wireless area, or 2) the base station may indicate a wireless area itself. In 1), a base station may be i) devices each providing a predetermined wireless area, interacting with one another, and controlled by an identical entity and ii) devices cooperating with each other for providing a predetermined wireless area. Based on a configuration type of a wireless area, a point, a transmission/reception point, a transmission point, a reception point, or the like may be an embodiment of a base station. In 2), a base station may be a wireless area itself that receives or transmits a signal from a perspective of a UE or a neighboring base station.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

In the specification, the UE and the base station are used as two (uplink or downlink) inclusive transceiving subjects to embody the technology and technical concepts described in the specifications. However, the UE and the base station may not be limited to a predetermined term or word.

Here, uplink (UL) refers to data transmission and reception from a UE to a base station, and downlink (DL) refers to data transmission and reception from a base station to a UE.

UL transmission and DL transmission may be performed using i) a time division duplex (TDD) scheme that performs transmission based on different times ii) a frequency division duplex (FDD) scheme that performs transmission based on different frequencies, or iii) a mixed scheme of the TDD and FDD schemes.

Further, in a wireless communication system, a standard may be developed by configuring a UL and a DL based on a single carrier or a pair of carriers.

The UL and the DL may transmit control information through a control channel, such as a PDCCH (Physical Downlink Control Channel), PUCCH (Physical Uplink Control Channel), and the like. The UL and the DL may transmit data through a data channel, such as PDSCH (Physical Downlink Shared Channel), PUSCH (Physical Uplink Shared Channel), and the like.

A DL may refer to communication or a communication path from a multi-transmission/reception point to a terminal, and an UL may refer to communication or a communication path from a terminal to a multi-transmission/reception point. In a DL, a transmitter may be a part of a multiple transmission/reception point and a receiver may be a part of a terminal. In an UL, a transmitter may be a part of a terminal and a receiver may be a part of a multiple transmission/reception point.

Hereinafter, signal transmission and reception through a channel such as a PUCCH, a PUSCH, a PDCCH, or a PDSCH, will be expressed as the transmission and reception of a PUCCH, a PUSCH, a PDCCH, or a PDSCH.

Meanwhile, higher layer signaling includes a radio resource control (RRC) signaling that transmits RRC information including an RRC parameter.

A base station performs DL transmission to terminals. A base station may transmit a physical DL control channel for transmitting DL control information such as scheduling required to receive a DL data channel that is a main physical channel for unicast transmission and DL control information, such as scheduling approval information for transmission on an UL data channel. Hereinafter, transmission and reception of a signal through each channel will be described as transmission and reception of a corresponding channel.

Varied multiple access schemes may be unrestrictedly applied to the wireless communication system. Various multiple access schemes, such as time-division multiple access (TDMA), frequency division multiple access (FDMA), code division multiple access (CDMA), orthogonal frequency division multiple access (OFDMA), non-orthogonal multiple access (NOMA), OFDM-TDMA, OFDM-FDMA, OFDM-CDMA, and the like may be used. Here, NOMA includes sparse code multiple access (SCMA), low cost spreading (LDS), and the like.

Embodiments of the present disclosure may be applicable to resource allocation in an asynchronous wireless communication scheme that evolves into LTE/LTE-advanced and IMT-2020 through GSM, WCDMA, and HSPA, and may be applicable to resource allocation in a synchronous wireless communication scheme that evolves into CDMA, CDMA-2000, and ultra mobile broadband (UMB).

In the present specifications, a Machine-Type Communication (MTC) terminal refers to a terminal that is low cost (or is not very complexity), a terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined $3^{rd}$ Generation Partnership Project (3GPP) Release-13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type. Alternatively, the MTC terminal may refer to a further Enhanced MTC terminal defined in Release-14.

In the present specification, a NarrowBand Internet of Things (NB-IoT) terminal refers to a terminal supporting radio access for cellular IoT. NB-IoT technology are aimed at improved indoor coverage, support for large-scale low-speed terminals, low latency sensitivity, very low terminal costs, low power consumption, and optimized network architecture.

Enhanced Mobile BroadBand (eMBB), massive Machine-Type Communication (mMTC), and ultra-reliable and low-latency communication (URLLC) are proposed as typical usage scenarios for New Radio (NR), which has been under discussion in the 3GPP in recent years.

The 5G technology refers to all network technologies that satisfy 5G requirements of international telecommunications union (ITU) and is used to include NR which has been newly developed in the 3GPP and enhanced LTE (eLTE) which is enhanced based on the typical LTE technology according to the 5G requirements.

In the present specification, a frequency, a frame, a subframe, a resource, a resource block, a region, a band, a subband, a control channel, a data channel, a synchronization signal, various reference signals, various signals, and various messages associated with NR may be interpreted as meanings used in the past or present or as various meanings to be used in the future.

Meanwhile, NR or 5G terms used in the following description may comprehensively refer to new next-generation network technology that satisfies the above-described 5G requirements. In addition, radio access technology that is distinguished from NR is referred to as conventional LTE technology.

A 5G network is divided into and include a 5G core network (hereinafter, referred to as 5GC, 5G CN, NGC, or the like) and a 5G radio access network (hereinafter, referred to as NG-RAN, 5G-RAN, or the like). NG-RAN may be configured as a set of one or more 5G NBs (gNBs), which are 5G base station nodes. In addition, an entity constituting the core network may be referred to as a core network entity. The core network entity may refer to 5GC-C or 5GC-U, which will be described below, or may refer to a set of one or more 5GC-Cs or a set of one or more 5GC-Us.

Meanwhile, a base station to which the 5G radio access technology is applied is referred to as a 5G base station, a base station or an NR base station, NG-RAN, or gNB, but is not limited to such terms.

In the typical LTE radio access technology, when the connection of a base station is changed to another base station as a UE moves, handover is performed by processing control of mobility between the radio base stations through an X2 or S1 interface. In addition, when a RU is changed to another RU in a base station, mobility of a terminal is supported by changing only an RF channel.

However, in 5G, a large number of small cell base stations are required to stably provide high-band frequency, high-speed transmission rate, high reliability, low-latency requirements and various services. Accordingly, the inside of the base station is split into a central unit (CU) and a distributed unit (DU), and a fronthaul interface between the CU and the DU is designed in a standard-based open architecture type. In addition, for distributed arrangement and virtualization of the CU, it is required to spit the CU into a CU-control plane (CU-CP) and a CU-user plane (CU-UP) and provide an interface therebetween.

That is, by considering such the open-type 5G base station split structure, there is need to develop a procedure for controlling mobility between different DUs connected to the identical/different CUs inside the 5G base station.

Accordingly, the present disclosure is to provide a radio protocol procedure and apparatus for changing/adding a connected DU according to movement of a UE on the basis of an interface between an internal CU and a DU device and a CU-internal interface between the CU-CP and the CU-UP.

The 5G radio access network (RAN or NG-RAN) may include a CU installed at a remote station and a DU installed at a cell site. In the present specification, the CU is referred to as a "CU" or a "central unit," and a DU is referred to as a "DU" or a "distributed unit". In addition, when the CU is configured as being split by plane, the CU may be separately described as a CU-control plane or CU-CP and a CU-user plane or a CU-UP. These terms are used only for illustrative purposes, but embodiments thereof are not limited to these terms.

An RF function or an antenna function may be included in a DU. However, the RF function or the antenna function may be separated from the DU, as necessary. When the RF function or the antenna function is separated, the base station may be designed as a three-stage split structure of CU, DU, and RFU (RF/antenna). Here, an interworking interface of a fronthaul section between the CU and DU in the 5G base station (gNB) is described as F1. When classification is required, a control plane interface is described as F1-C, and a user plane interface is described as F1-U. In some cases, the fronthaul may be described as midhaul.

Realistically, 5G communication service providers may optimally establish and operate 5G base stations by combining a variety of 5G base stations from various equipment providers depending on wireless data traffic/coverage demand, equipment price, and cell site environment. Also, when a base station using a millimeter-wave frequency is used, communication service providers are burdened with constructing a large number of small cells. Hence, it is necessary to develop an open architecture type fronthaul interface in order to secure flexibility through multi-vendor compatibility.

FIG. 1 is a view illustrating an exemplary internal configuration of a base station and an interworking interface according to an embodiment.

Referring to FIG. 1, a base station 100 may include one CU 110 and one or more DUs 120. For example, one or more DUs 120 may be connectable to one CU 110, and each DU 120 may be connectable to one CU 110 or a number of CUs 110. However, in order to simplify a node connection configuration between the CU 110 and the DU 120, the DU 120 may establish a connection to only one CU 110.

Meanwhile, a CU ID and a DU ID are used to identify the CU 110 and the DU 120 as unique identifiers, and the IDs may have different lengths. The CU ID may be identical to a base station ID (i.e., gNB ID), and the DU ID may be different from a cell ID.

One DU 120 may form one or more cells.

Particularly, a centralized CU device 110 may be designed as a software module form virtualized on high-capacity/high-performance general use base station hardware. Therefore, the CU 110 of the base station 100 is virtualized by splitting the CU 110 into i) a CU-CP node 112 in charge of a control plane (CP) and ii) CU-UP nodes 118 in charge of a user plane (UP) so that a large number of CU-UP nodes that process mass data can be efficiently operated at low cost with a small number of CU-CP nodes 112. For example, the CU-CP node 112 may be configured with the RRC, a control plane function of packet data convergence protocol (PDCP-CP), and a control plane function of service data adaptation protocol (SDAP-CP). The CU-UP node 118 may be configured with a user plane function of PDCP (PDCP-UP) and a user plane function of SDAP (SDAP-UP). Here, the CP functions of the PDCP and the SDAP may be removed or may be included in the RRC.

Meanwhile, all or some of functions of radio resource management (RRM) may be placed in only the CU-CP node 112, both the CU-CP node 112 and the CU-UP node 118, or all the CU 110 and the DUs 120.

The split CU-CP node 112 and the CU-UP node 118 may interwork via an open CU internal interface (indicated as E1 interface) in order to ensure interoperability therebetween.

One or more CU-UP nodes 118 are connectable to the one CU-CP node 112, and each CU-UP node 118 may be connected to one CU-CP node 112 or a number of CU-CP nodes 112. However, in order to simplify the node connection configuration, the CU-UP node 118 may establish to be connected to only one CU-CP node 112.

Meanwhile, direct connections among a plurality of CU-UP nodes 118 or indirect connections among a plurality of CU-UP nodes 118 through the CU-CP node 112 may be supported. Hereinafter, a description will be given on the basis of an indirect connection through the CU-CP node 118, and the technical idea of the present disclosure may be applicable to a direct connection.

For example, in order to distinguish between types of the CU-CP node 112 and the CU-UP node 118, classification may be possible through 1) a value of a CU Split ID or 2) a value of a CU-CP Type ID and a value of a CU-UP Type ID. For example, when the CU Split ID is 1, it indicates a split structure of RRC/PDCP-CP/SDAP-CP and PDCP-UP/SDAP-UP, and when the CU Split ID is 2, it indicates an RRC-PDCP/SDAP split.

In an alternative method, when the CU-CP Type ID is 1, it indicates acceptance of an RRC/PDCP-CP/SDAP-CP function, and when the CU-UP Type ID is 1, it indicates acceptance of a PDCP-UP/SDAP-UP function.

A CU-CP ID and a CU-UP ID are used to identify the CU-CP node 112 and the CU-UP node 118 as unique identifiers, and the IDs may have different lengths.

In addition, the CU 110 and the DU 120 may be connected via an internal open interface, which is herein described as F1 interface.

Figure 2:
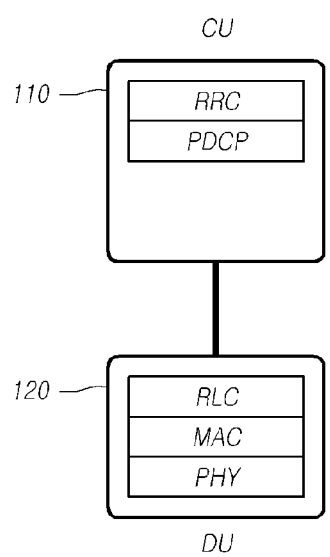
FIG. 2 is a view for describing functions of a central unit (CU) and a distributed unit (DU) according to an embodiment.

FIG. 2 is a view for describing each of the functions of a CU and a DU according to an embodiment.

Referring to FIG. 2, 5G base station baseband functions may be implemented in mainly physical (PHY), medium access control (MAC), radio link control (RLC), PDCP, SDAP, and RRC radio protocol layers or as an independent Radio Access Network Function (RANF) in a virtualized manner. Upper protocols and lower protocols may be appropriately separated and arranged in a CU 110 and a DU 120. It is apparent that detailed functions of each RANF may be variously performed.

In the present disclosure, at least one of PDCP, SDAP, and RRC functions is included in the CU 110, and the remaining functions are included in the DU 120. However, this is merely for convenience of description, and the separation and placement of functions between the CU 110 and the DU 120 may be designed in a different form and fall within the technical scope of the present disclosure.

For example, in the present specification, the base station includes a CU 110 and a plurality of DUs 120, the CU 110 is a logical node hosting the RRC layer, the SDAP layer, and the PDCP layer, and the DUs 120 are logical nodes hosting the RLC layer, the MAC layer, and the PHY layer.

Meanwhile, the SDAP may function to convert 5G Quality-of-Service (QoS) flows received from the 5G core network into radio bearers that can be processed at a base station, and the SDAP may be selectively operated as needed.

F1, which is an open fronthaul interface, is a point-to-point logical interface between the CU and the DU, signaling information is exchanged through an F1-C interface, and data is transmitted through an F1-U interface. UP data may be transmitted through GTP-U/UDP transmission protocols, and an F1 application protocol (F1AP) message may be transmitted through transmission protocols, such as Stream Control Transmission Protocol (SCTP).

E1, which is an open CU internal interface, is a point-to-point logical interface between the CU-CP and the CU-UP, signaling information may be exchanged through an E1-C interface, and data may be transmitted through an E1-U interface. UP data may be transmitted through GTP-U/UDP transmission protocols, and an E1AP message may be transmitted through transmission protocols, such as SCTP. Here, only the E1-C interface without the E1-U interface is considered. That is, it is assumed that the E1 is identical to the E1-C.

In the present disclosure, a specific procedure may be provided for controlling mobility of a UE when the UE moves in a base station configuration, as shown in FIGS. 1 and 2. However, in the present specification, description will be focused on a case which is not a handover situation in which a CU is changed according to movement of a UE. For example, the UE will be described focusing on i) a case where a DU is changed in the same base station and ii) a case where a DU and a CU-UP are changed, as shown in FIGS. 3 and 4.

Figure 3:
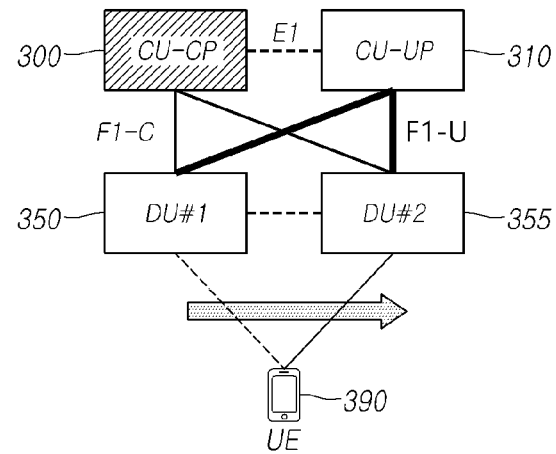
FIG. 3 is a view for describing a user equipment (UE) movement scenario in which DUs are connected to the same CU-control plane (CU-CP) and the same CU-user plane (CU-UP) according to an embodiment.
Figure 4:
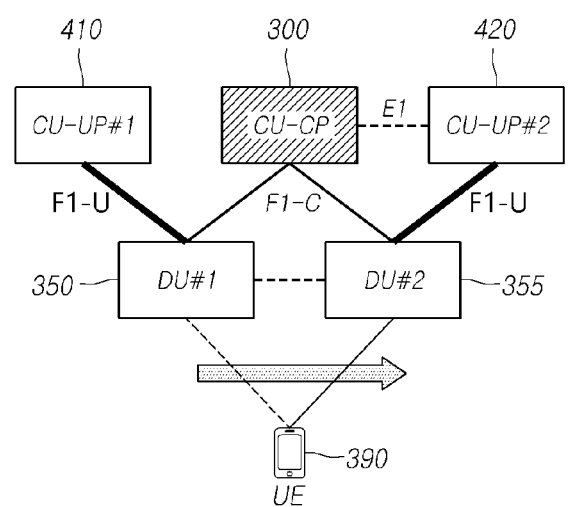
FIG. 4 is a view for describing a UE movement scenario in which DUs are connected to different CU-UPs according to an embodiment.

FIG. 3 is a view for describing a UE movement scenario in which DUs are connected to the same CU-CP and the same CU-UP according to an embodiment.

Referring to FIG. 3, a UE 390 may move while the UE 390 is connected to a base station. For example, the base station include a DU #1 350 and a DU #2 355. The UE 390 connected to the DU #1 350 may establish connection to the DU #2 355 as the UE 390 moves. Each of the DUs 350 and 355 provides one or more cells to the UE 390 so that the DU may be changed when a serving cell is changed according to the movement of the UE 390.

However, in FIG. 3, a CP-CP 300 and a CP-UP 310 are continuously used even when the DU of the UE 390 is changed to the other. That is, FIG. 3 shows a scenario in which the DU #1 350 and the DU #2 355 are connected to the same CU-UP 310 and CU-CP 300 through an F1-C interface and an F1-U interface.

FIG. 4 is a view for describing a UE movement scenario in which DUs are connected to different CU-UPs according to one embodiment.

Referring to FIG. 4, a CU of a base station may include one CU-CP 300 and a plurality of distributed CU-UPs 410 and 420. Therefore, different DUs 350 and 355 are connected to the same CU-CP 300, but are also connected to the different CU-UPs 410 and 420, respectively.

In this case, the UE 390 connected to the DU #1 350 may establish connection to the DU #2 355 as the UE 390 moves. In addition, the DU #1 350 is connected to a CU-UP #1 410, and the DU #2 is connected to a CU-UP #2 420.

Thus, as the UE 390 moves, the DU of the base station is switched from the DU #1 350 to the DU #2 355, and the CU-UP is switched from the CU-UP #1 410 to the CU-UP #2 420.

In the following description, a control operation of a base station for controlling mobility of a UE will be described with reference to the drawings.

Figure 5:
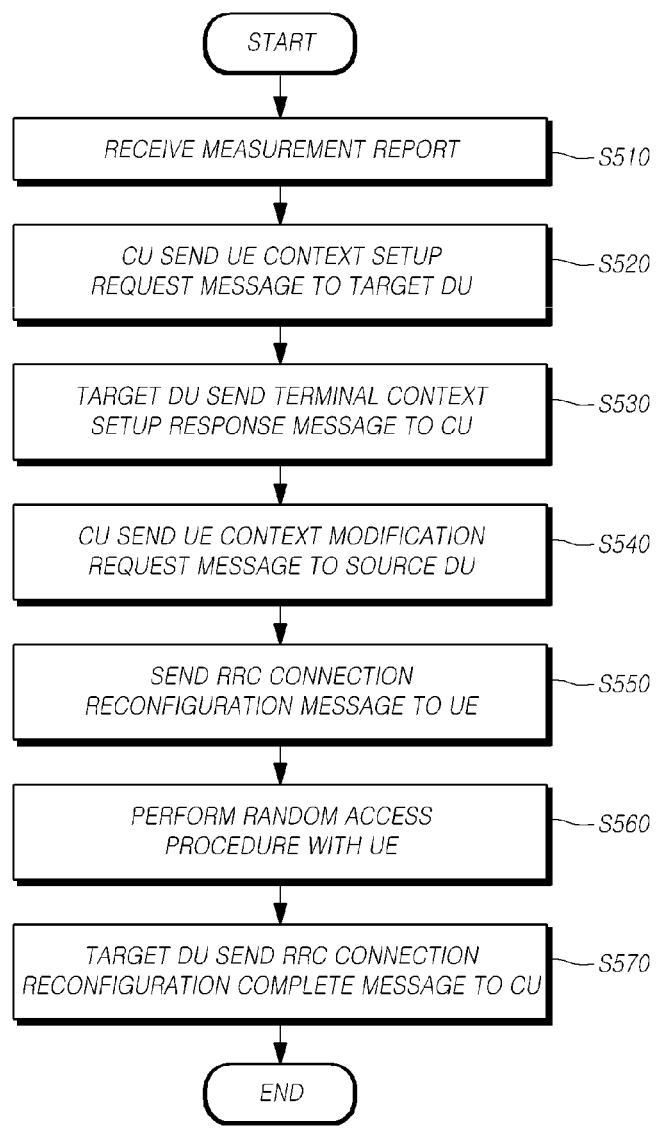
FIG. 5 is a flowchart for describing an operation of a base station according to an embodiment.

FIG. 5 is a flowchart for describing a method of a base station for controlling mobility of a UE according to an embodiment.

Referring to FIG. 5, in the method of a base station for controlling mobility of a UE, a CU receives a measurement report through a source DU from the UE at step S510. For example, the base station may receive a measurement report from the UE. The measurement report may be received periodically or aperiodically when an event condition is met. When the UE is connected to the source DU, the UE may transmit a measurement report to the source DU, and the source DU may send the measurement report to the CU over the internal F1 interface. The measurement report may be included in an UL RRC transfer message and be sent from the source DU to the CU.

Meanwhile, the base station may include a CU and a plurality of DUs. The CU may be a logical node hosting the RRC layer, the SDAP layer, and the PDCP layer. The DU may be a logical node hosting the RCL layer, the MAC layer, and the PHY layer. In addition, the CU may include one CU-CP and one or more CU-Ups, and the source DU and a target DU may each be connected to the same CU-UP through an E1 interface.

At step S520, the CU sends a UE context setup request message to the target DU to create a UE context and set a bearer up. For example, the CU may check the measurement report of a specific UE through the source DU. The CU may determine to change the DU of the UE based on the amount of DL transmission data and information, such as cell quality included in the above-described measurement report and the like. That is, the CU may determine whether to initiate control of mobility of a UE. In addition, the CU may determine a target DU which will provide a cell to the UE.

The CU may forward the UE context setup request message to the determined target DU over the F1 interface to request the creation of a UE context and the setup of a bearer of the corresponding UE when it is recognized that mobility control of the UE is necessary.

The UE context setup request message may include identifier information, i.e., CU UE F1AP ID, for identifying a UE connection over the F1 interface within the CU.

At step S530, the target DU sends a UE context setup response message to the CU to inform completion of the creation of a UE context and the setup of a bearer. For example, when the target DU receives the UE context setup request message, the target DU creates or stores a UE context of the corresponding UE and sets a bearer up for the corresponding UE. Then, when the UE context creation and the bearer setup are completed, the target DU sends a UE context setup response message to the CU to inform the completion of the creation of the UE context and the setup of the bearer.

The UE context setup response message may include identifier information, i.e., CU UE F1AP ID, for identifying a UE connection over the F1 interface within the CU and identifier information, i.e., DU UE F1AP ID, for identifying a UE connection over the F1 interface within the DU.

At step S540, the CU sends a UE context modification request message to the source DU including an RRC connection reconfiguration message to the source DU (S540).

For example, when the target DU completes the UE context setup, the base station sends a UE context modification request message to the source DU. The UE context modification request message may include information indicating to stop data transmission for the UE and for the RRC connection reconfiguration message to be forwarded to the UE.

Accordingly, the source DU may stop transmitting DL data to the UE.

At step S550, the source DU sends an RRC connection reconfiguration message to the UE. The source DU stops transmitting DL data according to a command from the CU and sends the RRC connection reconfiguration message included in the UE context modification request message to the UE.

For example, the RRC connection reconfiguration message may include i) information for instructing the UE to change the DU or the cell, ii) target DU information, iii) information for initial access to the target DU, and the like.

When the UE context modification request message received in operation S540 includes stop indication information, the source DU may send DL data delivery status frame information, which includes information about DL data that is not successfully transmitted to the UE to the CU as needed. This may be used to instruct the CU to send the stopped DL data to be sent to the UE through the target DU.

Upon completion of the transmission of the RRC connection reconfiguration message to the UE and modification of a UE context of the corresponding UE, the source DU may send a UE context modification response message to the CU.

At step S560, the target DU performs a random access procedure with the UE. For example, the UE confirms the instruction to change the cell or change the DU from the RRC connection reconfiguration message and performs a random access procedure to the target DU. In one example, the UE sends a random access preamble to access a cell of the target DU and receive a random access response message to proceed with the random access procedure.

When the random access procedure is completed, the UE is connected to the target DU and performs a data transmission/reception operation.

At step S570, the target DU forwards an RRC connection reconfiguration complete message received from the UE to the CU. The target DU performs a random access procedure with the UE and receives the RRC connection reconfiguration complete message from the UE according to the completion of the random access procedure.

When the target DU receives the RRC connection reconfiguration complete message from the UE, the target DU sends an UL RRC transfer message to the CU to convey the received RRC connection reconfiguration complete message.

The CU sends the DL data which is not transmitted to the UE to the target DU. The transmission of DL data may be performed before or after operation S570.

Through the above procedure, the UE is able to seamlessly transmit and receive data by changing one DU to the other in the base station without changing the base station, and the base station is able to control mobility of the UE.

Meanwhile, when the connection between the target DU and the UE is completed and the data transmission/reception is performed, the CU performs a procedure to completely release the connection of the UE to the source DU, which will be described below with reference to FIG. 6.

Figure 6:
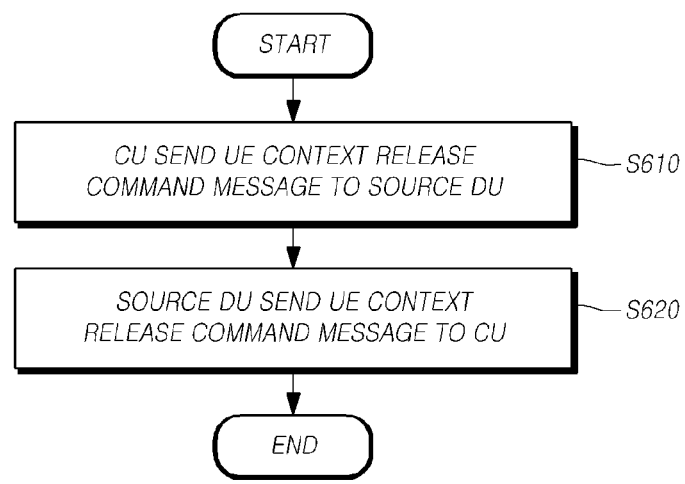
FIG. 6 is a flowchart for describing an additional operation of a base station to be performed when the UE completes a random access procedure with a target DU according to an embodiment.

FIG. 6 is a flowchart for describing an additional operation of a base station to be performed when the UE completes the random access procedure with the target DU according to one embodiment.

Referring to FIG. 6, after receiving the RRC connection reconfiguration complete message through the target DU, the CU may send a UE context release command message to the source DU at step S610.

For example, the UE context release command message may include information indicating to release/delete a UE context stored in the source DU. In addition, the UE context release command message may include identifier information, i.e., CU UE F1AP ID, for identifying a UE connection over the F1 interface within the CU and identifier information, i.e., DU UE F1AP ID, for identifying a UE connection over the F1 interface within the DU. Here, the DU UE F1AP ID may be an identifier allocated to identify a corresponding UE in the source DU.

When the source DU receives the UE context release command message, the source DU deletes/release the UE context for the corresponding UE. In addition, the source DU terminates the connection with the corresponding UE.

In addition, the source DU may release the UE context and send a UE context release complete message to the CU (S620). When the UE context for the corresponding UE is released, the source DU sends the UE context release complete message to the CU to inform that the connection toward the corresponding UE is terminated.

The UE context release complete message may include identifier information, i.e., CU UE F1AP ID, for identifying a UE connection over the F1 interface within the CU and identifier information, i.e., DU UE F1AP ID, for identifying a UE connection over the F1 interface within the DU. Here, the DU UE F1AP ID may be an identifier allocated to identify the corresponding UE in the source DU.

Through the above procedure, the source DU completely terminates the connection with the UE, and the mobility control procedure for the UE is finally ended.

Hereinafter, the inter-gNB-DU mobility procedure described with reference to FIGS. 5 and 6 will be briefly described again with reference to a signal diagram.

Figure 7:
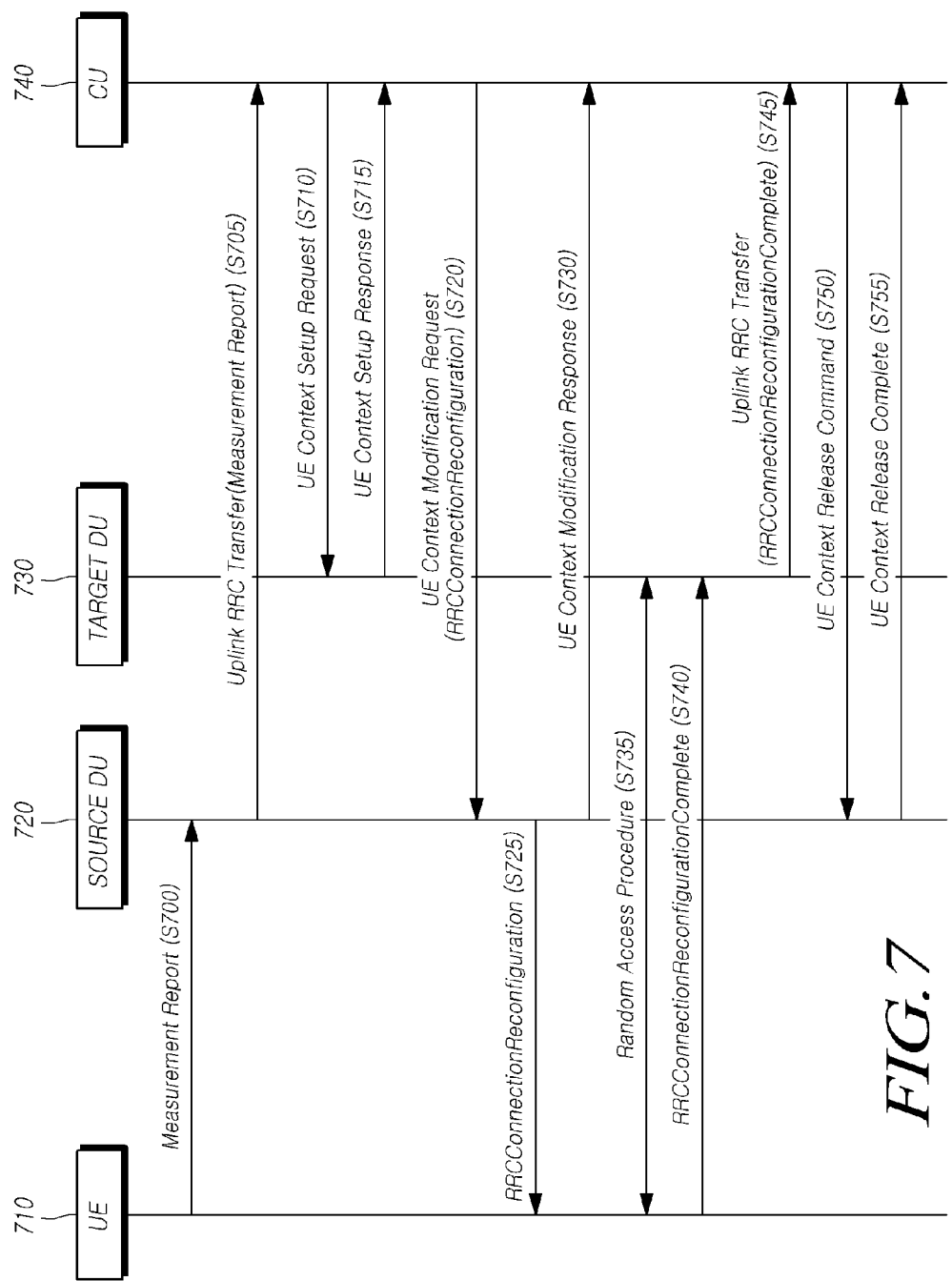
FIG. 7 is a signal diagram for describing a procedure for controlling mobility of a UE according to an embodiment.

FIG. 7 is a signal diagram for describing a procedure for controlling mobility of a UE according to an embodiment.

Referring to FIG. 7, a UE 710 may send a measurement report to a source DU 720 (S700).

The source DU 720 sends a UL RRC transfer message to a CU 740 to transfer the received measurement report (S705). The UL RRC transfer message includes the measurement report and is transparently transferred to the CU 740.

The CU 740 determines initiating a mobility control operation for the corresponding UE 710 based on the measurement report and information, such as the amount of DL data. The CU 740 sends a UE Context Setup Request Message to a target DU 730 (S710). The UE context setup request message may include information requesting to create UE context and set one or more bearers up.

The target DU 730 completes the creation of the UE context and the setup of the bearer and sends a UE Context Setup Response message to the CU 740 (S715).

The CU 740 sends a UE Context Modification Request message to the source DU 720 (S720). The UE Context Modification Request message includes an RRCConnectionReconfiguration message generated by the CU 740 and information indicating to stop transmitting data to the UE 710. In addition, the source DU 720 also sends a DL Data Delivery Status frame to inform the CU of the DL data not transmitted to the UE.

Thereafter, the source DU 720 sends an RRCConnection Reconfigurationmessage to the UE 710 (S725). The RRCConnectionReconfiguration message is created by the CU 740 and is included in the UE Context Modification Request message to be transmitted to the source DU 720, and the source DU 720 forwards the RRCConnection Reconfigurationmessage to the UE 710.

The source DU 720 sends a UE Context Modification Response message to the CU 740 to inform the CU 740 of completion of UE context modification (S730).

The UE 710 performs a random access procedure with the target DU 730 (S735). The target DU 730 may send the Downlink Data Delivery Status frame to the CU 740. DL packets including PDCP PDU that has failed to be transmitted from the source DU 720 to the UE 710 are sent from the CU 740 to the target DU 730. However, the DL data including the DL packets may be sent to the target DU 730 before or after the target DU 730 sends the DL Data Delivery Status.

When the UE 710 completes the random access procedure with the target DU 730, the UE 710 sends an RRCConnectionReconfigurationComplete message (S740).

The target DU 730 sends an Uplink RRC Transfer message to the CU 740 to convey the RRCConnectionReconfigurationComplete message (S745). The DL data packets are sent to the UE 710. In addition, UL data packets are sent from the UE 710 to the CU 740 through the target DU 730.

Then, the CU 740 sends a UE Context Release Command message to the source DU 720 to release the UE context of the source DU 720 and allow the source DU to ultimately terminate the connection with the UE 710 (S750).

The source DU 720 releases the UE context and sends a UE Context Release Complete message to the CU 740 (S755).

Through the above procedures, the base station is able to control mobility of the UE and control the data transmission/reception operation to be maintained even when the DU is changed as the UE moves.

The mobility control procedure used for a case where a DU of a base station is changed has been described with reference to FIGS. 5 to 7. For example, the scenario as shown in FIG. 3 is used an example for describing the mobility control procedure. However, a CP-UP constituting the CP may be changed when the DU is changed. Thus, hereinafter, a mobile control procedure of the base station to control mobility of a UE under a scenario of FIG. 4 will be described additionally.

Figure 8:
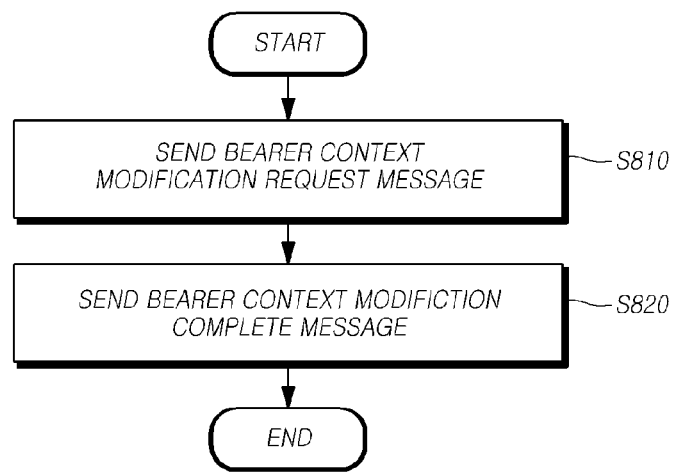
FIG. 8 is a flowchart for describing an operation of a base station to control UE mobility when DUs are connected to different CP-UPs according to an embodiment.

FIG. 8 is a flowchart for describing an operation of a base station to control UE mobility when DUs are connected to different CP-UPs according to an embodiment.

Referring to FIG. 8, as described above, the CU may include one CU-CP and a plurality of CU-UPs. In addition, a source DU and a target DU may be connected to different CU-UPs through an E1 interface.

In this case, when a DU connected with the UE is changed as the UE moves, the CU-UP of the CU is changed. Therefore, the CU-CP performs control of the CU-UP change.

For example, the CU-CP sends a bearer context modification request message to the CP-UP connected to the source DU and the CP-UP connected to the target DU at step S810.

In addition, the CU-CP receives bearer context modification response messages from the CU-UP connected to the source DU and from the CU-UP connected to the target DU at step S820. Through this procedure, the CU-CP modifies bearer context of each of the CU-UPs to modify the bearers of the UE with the DU while maintaining the bearers.

Meanwhile, the bearer context modification request message and the bearer context modification response message may include identifier information CU-CP UE E1AP ID for identifying a UE connection over an E1 interface within the CU-CP and identifier information CU-UP UE E1AP ID for identifying a UE connection over an E1 interface within each CU-UP.

The procedure for changing the CU-UP will be described in more detail with reference to FIG. 9 below. Procedures of FIG. 9 may be performed with the above-described procedure shown in FIG. 7, and FIG. 9 will focus on the procedure for changing between a CP node and a UP node inside the CP.

Figure 9:
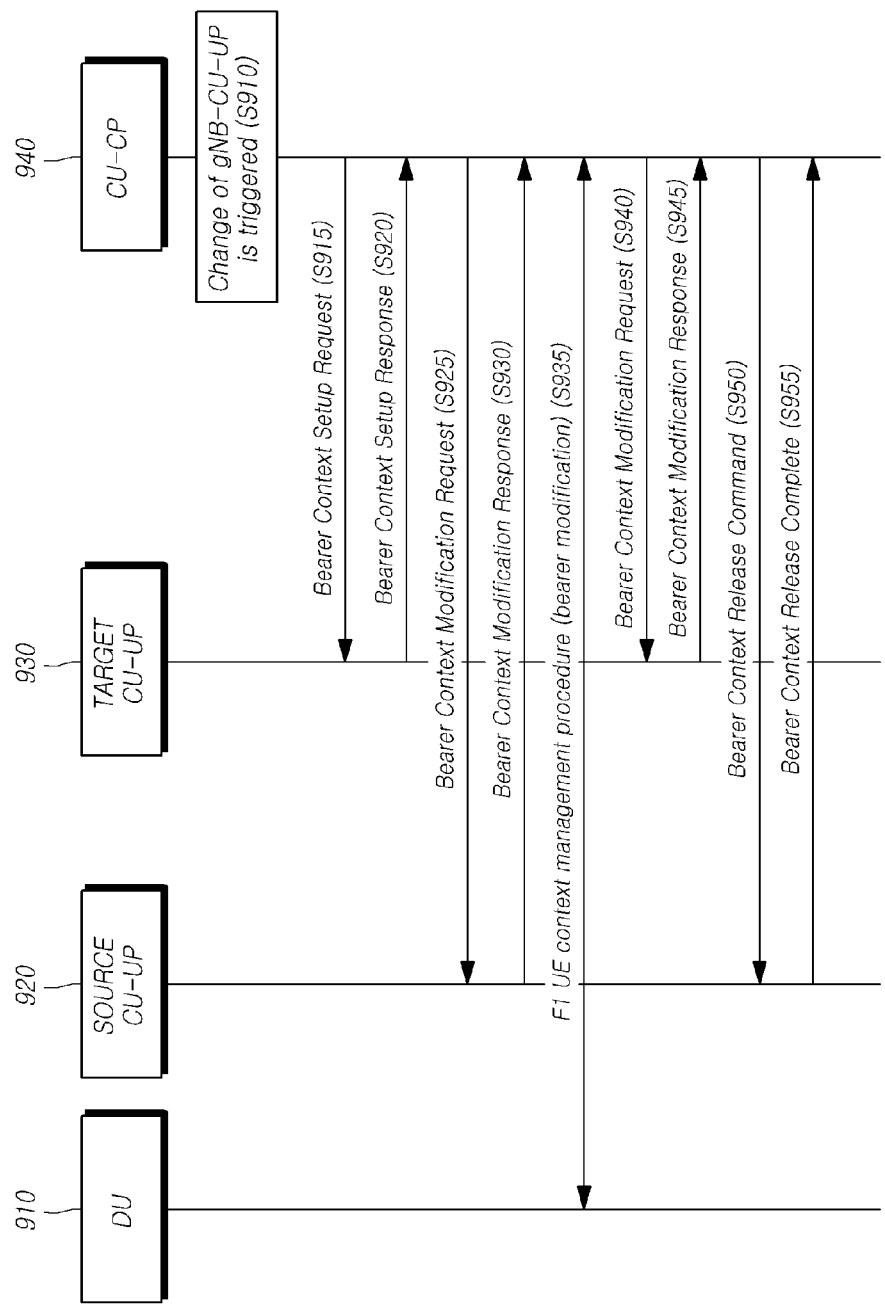
FIG. 9 is a signal diagram for describing a procedure for changing a CU-UP according to an embodiment.

FIG. 9 is a signal diagram for describing a procedure for changing a CU-UP according to an embodiment.

Referring to FIG. 9, a CU-CP 940 determines to change a CU-UP on the basis of measurement report information and the like forwarded from a source DU which has received the information from a UE (S910).

When the CU-CP 940 determines to change the CU-UP, the CU-UP 940 sends a bearer context setup request message to a target CU-UP 930 (S915). The target CU-UP 930 creates and sets bearer context up to be provided to the UE and sends a bearer context setup response message to the CU-CP 940 (S920).

Then, the CU-CP 940 sends a bearer context modification request message to a source CU-UP 920 (S925). The source CU-UP 920 performs a bearer context modification procedure with the CU-CP 940. The bearer context modification procedure is performed to enable the CU-CP 940 to retrieve PDCP UL/DL status and to exchange data forwarding information for the bearer.

When the bearer context modification procedure is completed, the source CU-UP 920 sends a bearer context modification response message to the CU-CP 940 (S930).

Then, the CU-CP 940 performs a procedure for modifying the UE context with the DU 910 through an F1 interface (S935). For example, the CU-CP 940 may send a UE context modification request message to the source DU and receive a response message. The UE context modification procedure may be performed to change UL TNL address information for F1-U for one or more bearers in the DU.

When operation S935 is completed, the CU-CP 940 sends a bearer context modification request message to the target CU-UP 930 (S940) and receives a response message (S945).

Lastly, the CU-CP 940 sends a bearer context release command message to the source CU-UP 930 (S950). The source CU-UP 920 deletes/releases the bearer context according to the corresponding message and sends a bearer context release complete message to the CU-CP 940 (S955).

Then, the source CU-UP 920 forwards data received from a core network to the target CU-UP 930, and the CU-CP 940 performs a data transmission path update with a core network entity (e.g., AMF/UPF). When the update of data transmission path is completed, the core network entity sends DL data for the UE to the CU-UP 930 to complete establishment of a new data transmission path.

Through the above procedure, it is possible to perform a mobility control operation when a DU is changed as the UE moves, and accordingly a CU-UP associated with the DU is changed.

The operations of each procedure may be performed in different order or combined or omitted as necessary.

Meanwhile, in the following description, specific procedures will be described according to more various embodiments of the present disclosure. That is, radio protocol procedures and apparatus for controlling mobility according to change/addition of UE connection between different DUs connected to a CU in accordance with internal CU-CP constituting a base station and UE movement between the CU-CP and a plurality of DU devices will be described in detail. Embodiments described below may be detailed embodiments or modified embodiments of the above-described embodiments.

Figure 10:
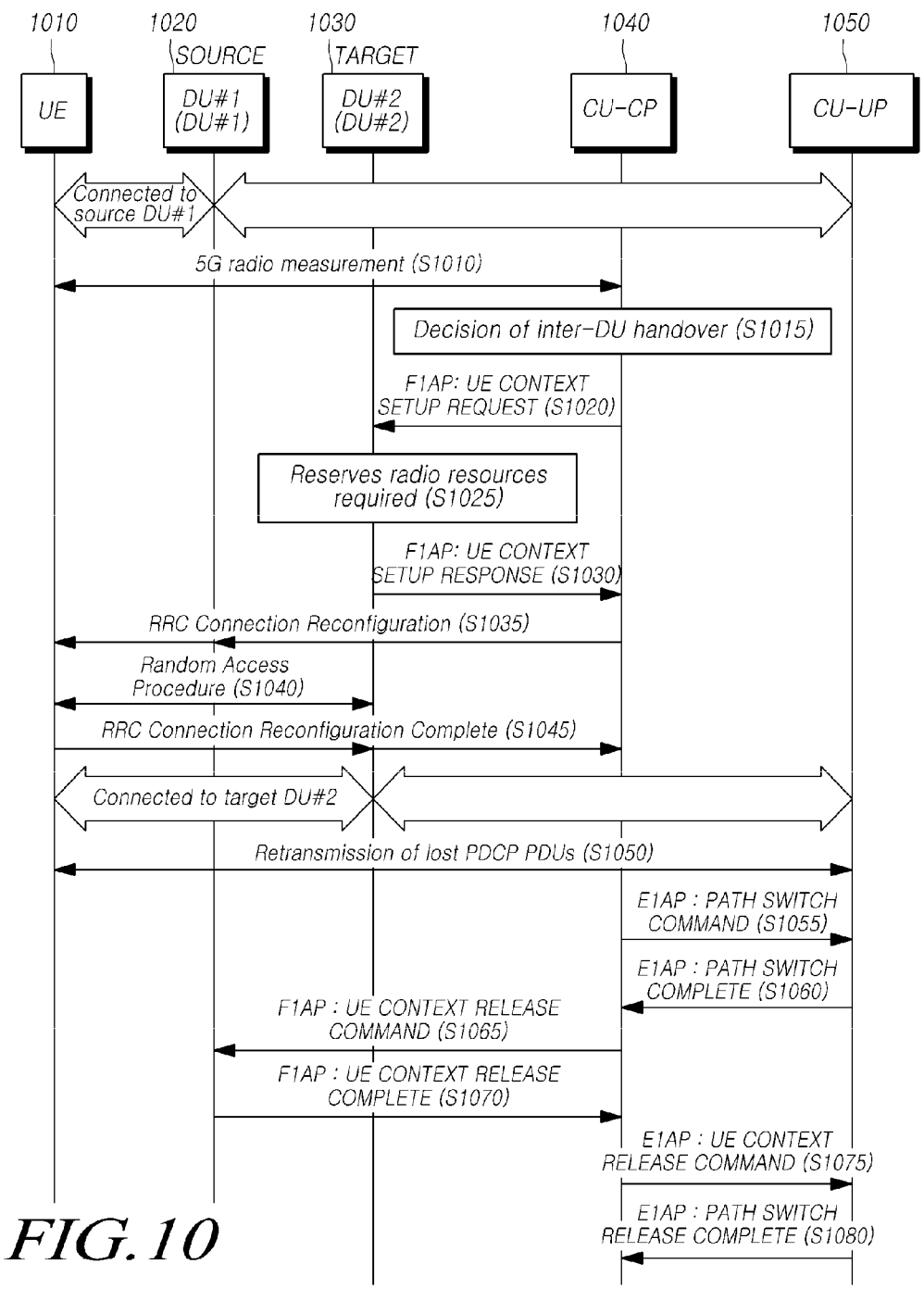
FIG. 10 is a signal diagram for describing a UE mobility control operation for a case where DUs are associated with the same CU-CP and the same CU-UP according to an embodiment.

(1) Embodiment of Procedure for Controlling Mobility Between Different DUs Connected to the Same CU-CP and the Same CU-UP FIG. 10 is a signal diagram for describing a UE mobility control operation for a case where DUs are associated with the same CU-CP and the same CU-UP according to an embodiment.

In particular, FIG. 10 illustrates a procedure for performing UE mobility control in the situation shown in FIG. 3. That is, a DU is changed as a UE moves, wherein a source DU and a target DU are associated with the same CU-UP and the same CU-CP.

Referring to FIG. 10, the UE 1010 is connected to a source DU 1020. The source DU 1020 is associated with a CU-UP 1050 and performs a user data transmission/reception operation of the UE.

A radio channel measurement report of the UE 1010 is sent to the CU-CP 1040 through the source DU 1020 (S1010).

The CU-CP 1040 determines handover between DUs using the measurement report (S1015). For example, the CU-CP 1040 may determine the target DU 1030 and a target cell.

The CU-CP 1040 sends a UE CONTEXT SETUP REQUEST message to the target DU 1030 through an F1-C interface to request necessary initial UE information and bearer (SRB and DRB) setup (S1020). In this case, when handover is determined, new Cell Radio Network Temporary Identifier (C-RNTI) information to be allocated to the UE 1010 by the CU-CP 1040 may be included in the UE CONTEXT SETUP REQUEST message.

The target DU 1030 allocates necessary radio resources (S1025). When there is collision between the C-RNTI newly allocated by the CU-CP 1040 and currently used C-RNTI, the target DU 1030 may change the C-RNTI. When the target DU 1030 has a function to allocate new C-RNTI information, the target DU 1030 is capable of direct allocation.

The target DU 1030 sends a UE CONTEXT SETUP RESPONSE message to the CU-CP 1040 through an F1-C interface to inform the CU-CP 1040 about the UE information and completion of the bearer setup (S1030).

The CU-CP 1040 encapsulates an RRC Connection Reconfiguration request in a DL RRC TRANSFER message and sends the DL RRC transfer message to the source DU 1020 through the F1-C interface (S1035). In this case, the RRC Connection Reconfiguration message may include a start indicator for handover between DUs, mobility control-related information element (IE), and the like. The source DU 1020 sends an RRC Connection Reconfiguration to the UE 1010.

The UE 1010 performs a random access procedure with a target cell within the target DU 1030 (S1040). When the random access procedure is successfully performed, the UE 1010 transfers an RRC Connection Reconfiguration Complete message to the target DU 1030. The target DU 1030 encapsulates the RRC Connection Reconfiguration Complete message in a UL RRC TRANSFER message and sends the UL RRC TRANSFER message to the CU-CP 1040 through the F1-C interface (S1045).

The UE 1010 is newly connected to the target DU 1030 and the target DU 1030 is associated with the CU-UP 1050.

The source DU 1020 sends PDCP PDU SN information and/or data delivery status information to the CU-CP 1040 to enable the CU to identify PDU lost due to the change of DU and perform a retransmission procedure for the lost PDU (S1050). Accordingly, the UE recovers the lost PDU. In this case, the data delivery status information may be independently sent to the CU-UP 1050 by the source DU 1020 through the F1-U interface.

The CU-CP 1040 sends a PATH SWITCH COMMAND or a BEARER MODIFICATION REQUEST message to the CU-UP 1050 through the E1 interface (S1055).

After path switching or bearer modification between the CU-UP 1050 and the target DU 1030 is completed, the CU-UP 1050 sends a PATH SWITCH RESPONSE or BEARER MODIFICATION RESPONSE message to the CU-CP 1040 through the E1 interface (S1060).

The CU-CP 1040 sends a UE CONTEXT RELEASE COMMAND message to the source DU 1020 through the F1-C interface to request UE information release (S1065). The source DU 1020 releases the UE context.

The source DU 1020 sends a UE context release complete message to the CU-CP 1040 through the F1-C interface to inform CU-CP 1040 of completion of the UE information release request (S1070).

Then, a UE CONTEXT RELEASE procedure between the CU-CP 1040 and the CU-UP 1050 is performed through the E1 interface to release the UE information (S1075 and S1080).

Meanwhile, when the UE is connectable to one or more DUs, i.e., multi-connectivity is possible, a part of the above procedure may be modified.

For example, operations S1110 to S1145 of FIG. 10 may be maintained similarly or equally. In particular, since a DU connection is added instead of changing between DUs, it may be construed as connection addition rather than handover. Therefore, a start indicator for multi-connectivity between DUs and multi-connectivity control-related IE may be used, instead of the start indicator for handover between DUs and the mobility control-related IE.

After operation S1145, the UE is additionally connected to the target DU in addition to the source DU. When one connection is disconnected among the multiple connections, retransmission procedure for lost PDU is performed. Accordingly, the UE recovers the lost PDU.

In this case, when a radio link between the DU and the UE is experiencing outage, the DU recognizes the outage and informs the CU of a corresponding event through the F1-U or F1-C interface using the data delivery status information or a separate indicator (e.g., Radio Link Outage/Failure Indication or the like). In addition, when the radio link with the disconnected DU is recovered, the DU may inform the CU of a corresponding event through the F1-U or F1-C interface using the data delivery status information or a separate indicator (e.g., Radio Link Outage/Failure Recovered Indication or the like).

Then, the CU-CP sends a PATH ADDITION COMMAND or BEARER ADDITION REQUEST message to the CU-UP over the E1 interface. After completion of the path addition or bearer addition between the CU-UP and the target DU, the CU-UP sends a PATH ADDITION RESPONSE or BEARER ADDITION RESPONSE message to the CU-CP over the E1 interface.

When one connection is disconnected among the multiple connections, the CU-CP sends a UE CONTEXT RELEASE COMMAND message to a DU to be released over the F1-C interface to request UE information release. The DU to be released sends a UE CONTEXT RELEASE COMPLETE message to the CU-CP over the F1-C interface to inform the CU-CP of completion of the UE information release request.

The UE context release procedure between the CU-CP and the CU-UP is performed through the E1 interface to release the UE information.

Further, for a structure in which the CU is not split into the CU-CP and the CU-UP, the above-described CU-CP and CU-UP may be integrally interpreted as the CU.

Figure 11:
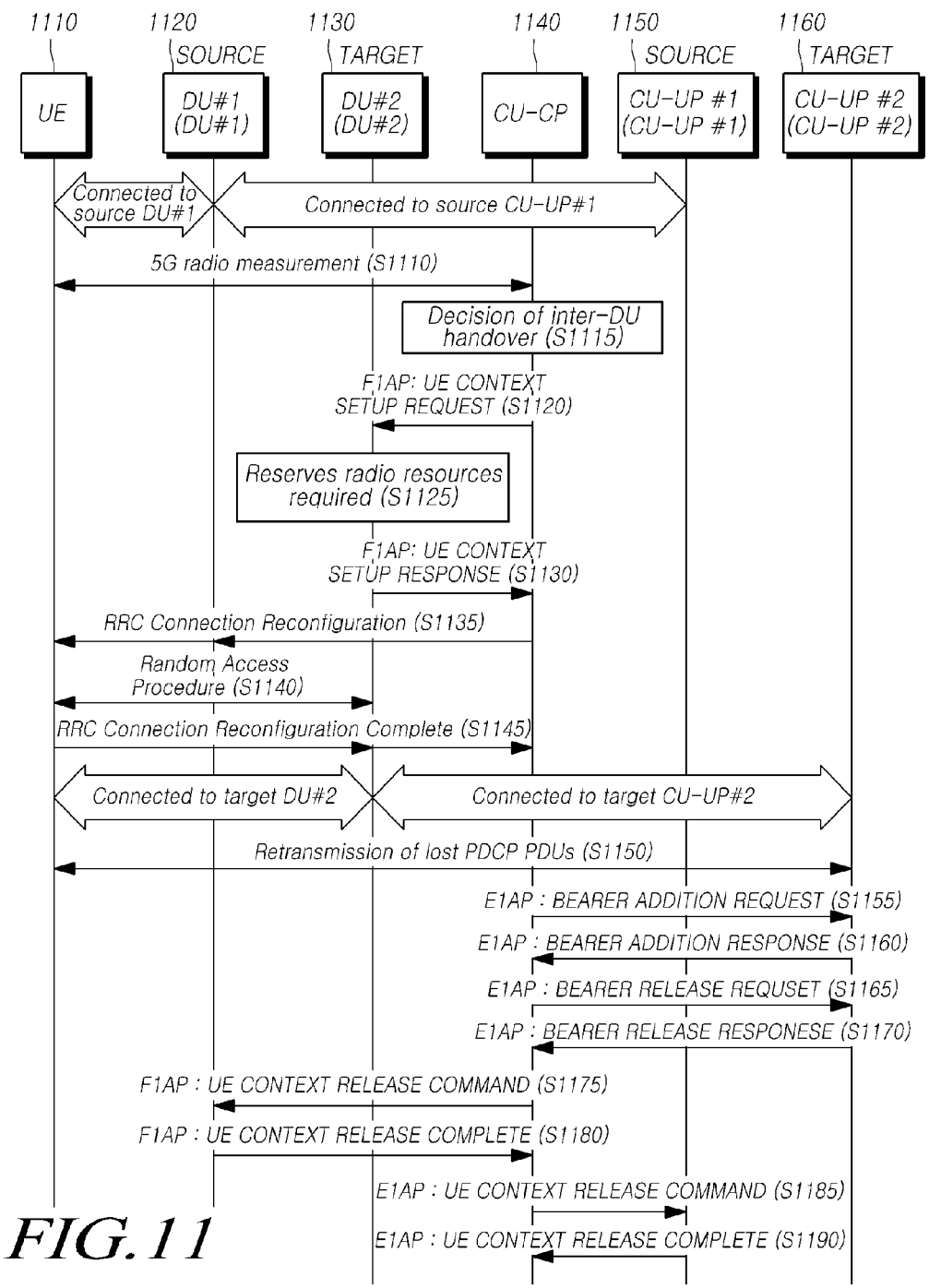
FIG. 11 is a signal diagram for describing a UE mobility control operation for a case in which DUs are associated with different CU-UPs according to an embodiment.

(2) Embodiment of Procedure for Controlling Mobility Between DUs Connected to the Same CU-CP and Connected to Different CU-UPs FIG. 11 is a signal diagram for describing a UE mobility control operation for a case in which DUs are associated with different CU-UPs according to an embodiment.

In particular, FIG. 11 illustrates a procedure for performing UE mobility control in the situation shown in FIG. 4. That is, a DU is changed as a UE moves, and a source DU and a target DU are associated with different CU-UPs and associated with the same CU-CP.

Referring to FIG. 11, the UE 1110 is connected to the source DU 1120. In addition, the UE 1110 transmits data to and receives data from the CU-UP 1150 through the source DU 1120.

A radio channel measurement report of the UE 1110 is sent to the CU-CP 1140 through the source DU 1120 (S1110). The CU-CP 1140 determines handover between DUs using the measurement report. For example, the CU-CP 1140 determines a target DU and a target cell (S1115).

The CU-CP 1140 sends a UE CONTEXT SETUP REQUEST message to the target DU 1130 over an F1-C interface to request necessary initial UE information and bearer (Signaling Radio Bearer (SRB) and Data Radio Bearer (DRB)) setup (S1120). In this case, when handover is determined, new C-RNTI information to be allocated to the UE 1110 by the CU-CP 1140 may be included in the UE CONTEXT SETUP REQUEST message to be sent.

The target DU 1130 allocates necessary radio resources (S1125). When there is collision between the C-RNTI newly allocated by the CU-CP 1140 and a currently used C-RNTI, the target DU 1130 may change the C-RNTI. When the target DU 1130 has a function to allocate new C-RNTI information, the target DU 1130 is capable of direct allocation.

The target DU 1130 sends a UE CONTEXT SETUP RESPONSE message to the CU-CP 1140 over an F1-C interface to inform the CU-CP 1140 of the UE information and completion of the bearer setup (S1130).

The CU-CP 1140 encapsulates an RRC Connection Reconfiguration request in a DL RRC TRANSFER message and sends the message to the source DU 1120 over the F1-C interface. In this case, a start indicator of handover between DUs, mobility control-related IE, and the like may be included in the DL RRC TRANSFER message to be sent. The source DU 1120 sends an RRC Connection Reconfiguration message to the UE 1110 (S1135).

The UE 1110 performs a random access procedure with the target cell within the target DU 1130 (S1140). When the random access procedure is successfully completed, the UE 1110 sends an RRC Connection Reconfiguration Compete message to the target DU 1130 and the target DU 1130 encapsulates the RRC Connection Reconfiguration Complete message in a UL RRC TRANSFER message and sends the message to the CU-CP 1140 over the F1-C interface (S1145).

Accordingly, the UE 1110 is newly connected to the target DU 1130. The source DU 1120 sends PDCP PDU SN information and/or data deliver/status information to the CU-CP 1140 to enable the CU to recognize PDU lost due to change of a DU and perform retransmission procedure for the lost PDU. Accordingly, the UE 1110 recovers the lost PDU. In this case, the source DU 1120 may independently send the data delivery status information to the CU-UP 1150 over the F1-U interface.

The CU-CP 1140 sends a BEARER ADDITION REQUEST or PATH SWITCH COMMAND message to the target CU-UP 1160 over the E1 interface (S1155). After completion of the bearer addition or path switching between the target CU-UP 1160 and the target DU 1130, the target CU-UP 1160 sends a BEARER ADDITION RESPONSE or PATH SWITCH RESPONSE message to the CU-UP 1140 over the E1 interface (S1160).

The CU-CP 1140 sends a BEARER RELEASE REQUEST message to the source CU-UP 1150 over the E1 interface (S1165). After completion of bearer release between the source CU-UP 1150 and the source DU 1120, the source CU-UP 1150 sends a BEARER RELEASE RESPONSE message to the CU-CP 1140 over the E1 interface (S1170).

The CU-CP 1140 sends a UE CONTEXT RELEASE COMMAND message to the source DU 1120 over the F1-C interface to request UE information release (S1175). The source DU 1120 sends a UE CONTEXT RELEASE COMPLETE message to the CU-CP 1140 over the F1-C interface to inform the CU-CP 1140 of completion of the UE information release request (S1180).

The UE CONTEXT RELEASE procedure between the CU-CP 1140 and the source CU-UP 1150 is performed through the E1 interface to release the UE information (S1185 and S1190).

Meanwhile, when the UE is connectable to one or more DUs, i.e., multi-connectivity is possible, a part of the above procedure may be modified. For example, operations S1110 to S1145 may be maintained equally or similarly.

In particular, since a DU connection is added instead of change between DUs, it may be construed as connection addition rather than handover. Therefore, a start indicator for multi-connectivity between DUs and multi-connectivity control-related IE may be used, instead of the start indicator for handover between DUs and the mobility control-related IE.

Figure 12:
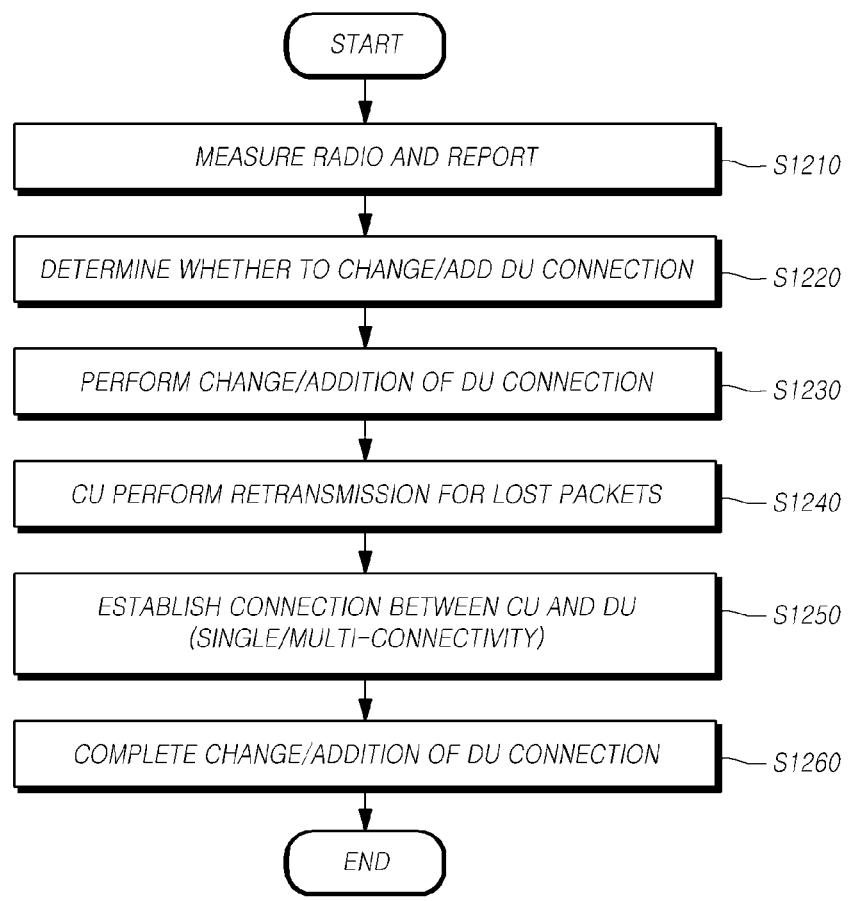
FIG. 12 is a flowchart for describing a procedure for controlling DU change/addition in a base station according to an embodiment.

FIG. 12 is a flowchart for describing a method of a base station for controlling DU change/addition according to an embodiment.

Referring to FIG. 12, similar to the step S1110 of FIG. 11, the UE sends a measurement report to the CU through the source DU at step S1210.

The CU determines whether to change or add the DU connected to the UE using the measurement report or the amount of DL transmission data at step S1220. For example, when the amount of DL data to be transmitted to the UE is greater than or equal to a reference amount and the measurement report indicates that a cell having a good radio quality exists in the UE, the CU may determine to add an additional cell to the UE.

According to the determination of the CU, the UE is additionally connected with a target DU in addition to the source DU at step S1230. For example, the CU may perform a procedure for connecting the UE and an additional DU by performing operations in steps S1120 to S1145.

When one connection is disconnected among the multiple connections, the CU performs retransmission procedure for lost PDU. Accordingly, the UE recovers the lost packet data unit (PDU).

In this case, when a radio link between the DU and the UE is experiencing outage, the DU recognizes the outage and informs the CU of a corresponding event through the F1-U or F1-C interface using the data delivery status information or a separate indicator (e.g., Radio Link Outage/Failure Indication or the like). In addition, when the radio link with the disconnected DU is recovered, the DU may inform the CU of a corresponding event through the F1-U or F1-C interface using the data delivery status information or a separate indicator (e.g., Radio Link Outage/Failure Recovered Indication or the like).

The CU and the DU perform connection establishment at step S1250.

For example, the CU-CP sends a PATH ADDITION COMMAND or BEARER ADDITION REQUEST message to the target CU-UP over the E1 interface.

After completion of the path addition or bearer addition between the target CU-UP and the target DU, the target CU-UP sends a PATH ADDITION RESPONSE or BEARER ADDITION RESPONSE message to the CU-CP over the E1 interface.

In addition, the CU sends a UE context modification and an addition message to an added DU and receives a response message.

When one connection is disconnected among the multiple connections, the CU-CP sends a UE CONTEXT RELEASE COMMAND message to the DU to be released over the F1-C interface to request UE information release.

The DU to be released sends a UE CONTEXT RELEASE COMPLETE message to the CU-CP over the F1-C interface to inform the CU-CP of completion of the UE information release request. The UE CONTEXT RELEASE procedure between the CU-CP and the source CU-CP is performed through the E1 interface to release the UE information.

Through the above procedure, the UE establishes connection with an additional DU or a changed DU to transmit and receive data to and from the DU at step S1260.

In addition, the messages to be sent and received in each operation described with reference to FIGS. 5 to 12 may include at least one of the following information elements. That is, the IEs used in the mobility control procedure described in the present specification may be described as follows, and all or a part thereof may be used.

- CU UE F1AP ID (or CU-CP UE F1AP ID): an identifier for identifying a UE connection over the F1 interface within a corresponding CU
- DU UE F1AP ID: an identifier for identifying a UE connection over the F1 interface within a corresponding DU
- CU-CP UE E1AP ID: an identifier for identifying a UE connection over the E1 interface within a corresponding CU-CP
- CU-UP UE E1AP ID: an identifier for identifying a UE connection over the E1 interface within a corresponding CU-UP
- CU ID: a CU identifier
- DU ID: a DU identifier
- CU Split ID: a CU internal split structure identifier
- CU-CP Type ID: a CU-CP structure identifier
- CU-UP Type ID: a CU-UP structure identifier
- CU-CP ID: a CU-CP node identifier
- CU-UP ID: a CU-UP node identifier
- Cell ID: a cell identifier
- gNB ID: a base station identifier
- Global gNB ID: a global base station identifier consisting of Public Land Mobile Network (PLMN) ID and gNB ID
- NG-RAN Cell ID (NCI): a cell identifier consisting of CU ID (or gNB ID), DU ID, and Cell ID
- NG-RAN Cell ID (NCI): a cell identifier consisting of CU ID (or gNB ID) DU ID, and Cell ID
- NG-RAN CGI: a base station cell global identifier consisting of PLMN ID and NG-RAN cell ID
- CU Group ID: an ID of a group consisting of one or more CUs
- DU Group ID: an ID of a group consisting of one or more DUs
- Master CU ID: a master CU identifier. A main CU node for controlling the other CUs in a CU group or controlling connected DUs
- Master DU ID: a master DU identifier. A main DU node for controlling the other DUs in a DU group
- Master CU-UP ID: a master CU-UP. A main CU-UP node for controlling a corresponding UP among CU-UPs. The master CU-UP node may have a direct F1-U interface with a DU node.
- C-RNTI: cell RNTI allocated to each UE
- E-RAB ID: a radio bearer identifier
- UE Radio Capability: radio capability of a UE, including 5G, eLTE, and LTE values.
- UE Category: NR and/or maximum rate capability supported by a UE. Defined according to Non Standalone (NSA) (may vary by structure option) and Standalone (SA) supported UE.
- GTP-TEID is used by some or all of gNB TEID, CU TEID, and DU TEID
- Slice ID: a network for slicing identifier
- QFI: a QoS flow identifier
- NG-RAN QoS Parameter: a QoS parameter of a base station
- Inter-DU Handover Start Indication: a start indicator for handover between DUs
- Inter-DU Multi-connectivity Start Indication: a start indicator for multi-connectivity between DUs
- Radio Link Outage/Failure Indication: a radio link outage/failure indicator
- Radio Link Outage/Failure Recovered Indication: a radio link outage/failure recovered indicator As described above, in the next-generation radio access technology, the internal structure of the base station is split into open modules and designed with standard-based open interfaces so that it is possible to provide more stable mobility by efficiently interworking between 5G CU-CP/CU-UP and DU base stations of other equipment manufacturers. In addition, it is possible to not only enhance the optimal user experience, but also to reduce costs for constructing a radio network.

In the following description, a configuration of a base station which performs the above-described mobility control operation will be briefly described with reference to a drawing.

In the following description, a base station controller is described as controlling all of a CU, DUs, and a CU-CP/CU-UP and the base station is described as including the CU and the DUs. However, such descriptions are merely provided to facilitate the explanation of the configuration of the base station, and a controller of each of the CU and the DUs may perform operations of the controller, which will be described below, in a distributed manner.

Figure 13:
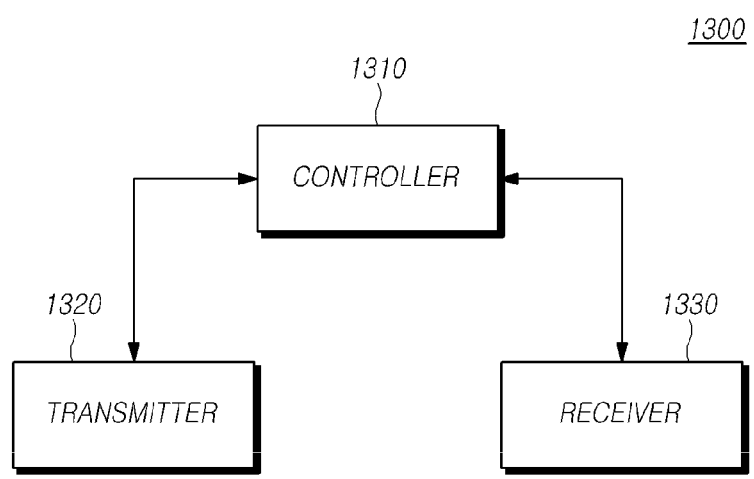
FIG. 13 is a diagram for describing a configuration of a base station according to an embodiment.

FIG. 13 is a diagram for describing an internal structure of a base station according to an embodiment.

Referring to FIG. 13, a base station 1300 performs a UE mobility control procedure. Such a base station 1300 includes a receiver 1330, a controller 1310, and a transmitter 1320. The receiver 1330 receives a measurement report from a UE through a source DU. The controller 1310 i) controls the CU to send a UE context setup request message to a target DU to create a UE context and set a bearer up, ii) controls the target DU to send a UE context setup response message to inform the CU of completion of the creation of a UE context and the setup of a bearer, and iii) controls the CU to send a UE context modification request message including an RRC connection reconfiguration message to the source DU. The transmitter 1320 sends the RRC connection reconfiguration message to the UE through the source DU. The target DU performs a random access procedure with the UE and forwards an RRC connection reconfiguration complete message, which has been received from the UE, to the CU.

For example, the base station 1300 includes the CU and a plurality of DUs. The CU is a logical node hosting the RRC layer, the SDAP layer, and the PDCP layer and the DUs may be configured as logical nodes hosting the RLC layer, the MAC layer, and the PHY layer.

Meanwhile, the UE context modification request message may include stop indication information to instruct the source DU to stop data transmission for the UE.

In addition, when the source DU receives the stop indication information, the source DU sends DL data delivery status frame information, which includes information about DL data not transmitted to the UE, to the CU.

The UE context setup request message includes identifier information, i.e., CU UE F1AP ID, for identifying a UE connection over the F1 interface within the CU. The UE context setup response message includes identifier information, i.e., CU UE F1AP ID, for identifying a UE connection over the F1 interface within the CU and identifier information DU UE F1AP ID for identifying a UE connection over the F1 interface within the DU.

In addition, when the RRC connection reconfiguration complete message is sent to the CU, the controller 1310 controls the CU to send a UE context release command message to the source DU. In addition, the controller 1310 may control the source DU to release the UE context according to the UE context release command message and to send a UE context release complete message to the CU.

Meanwhile, the CU includes one CU-CP and a plurality of CU-Ups, and the source DU and the target DU may be connected to different CU-UPs through an E1 interface.

In this case, the CU-CP may send a bearer context modification request message to the CU-UP connected to the source DU and the CU-UP connected to the target DU, and the CU-UP may receive bearer context modification response messages from the CU-UP connected to the source DU and the CU-UP connected to the target DU.

Also, the bearer context modification request message and the bearer context modification response message may include identifier information, i.e., CU-CP UE E1AP ID, for identifying a UE connection over the E1 interface within the CU-CP and identifier information, i.e., CU-UP UE E1AP ID, for identifying a UE connection over the E1 interface within each of the CU-UPs.

In addition, the controller 1310 controls an overall operation of the base station 1300 to change and add a DU or a CU-UP according to movement of the UE, which is required to perform the above-described embodiments.

Moreover, the transmitter 1320 and the receiver 1330 are used to transmit and receive signals, messages, and data, which are required to perform the above-described embodiments, to and from the UE.

The terms "system," "processor," "controller," "component," "module," "interface," "model," "unit," and the like as used hereinabove may generally refer to computer-related entity hardware, a combination of hardware and software, software, or to software in execution. For example, the above-described elements may include a process performed by a processor, a processor, a controller, a control processor, an entity, an execution thread, a program and/or a computer, but are not limited thereto. For example, an application running on a controller or a processor and the controller or the processor may all be elements. One or more elements may reside within a process and/or an execution thread and the elements may reside in one system or be distributed to two or more systems.

According to the present disclosure, even in a case of a base station split into a plurality of logical nodes, it is possible to continuously maintain communication even when a UE moves.

In addition, according to the present disclosure, when a UE moves within a coverage controlled by the same base station, it is possible to continuously provide a communication service to the UE by changing a DU and to maintain UE mobility control of the next-generation radio access technology.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A method of a base station for controlling mobility of user equipment (UE), the method comprising:
   receiving, by a central unit (CU), a measurement report from a UE through a source distributed unit (DU);
   sending, by the CU, a UE context setup request message to a target DU to create a UE context and set a bearer up when determination is made to control mobility of the UE according to the measurement report;
   sending, by the target DU, a UE context setup response message to the CU to inform the CU of completion of creating the UE context and setting up the bearer;
   sending, by the CU, a UE context modification request message including a radio resource control (RRC) connection reconfiguration message to the source DU;
   performing, by the target DU, a random access procedure with the UE; and
   forwarding, by the target DU, an RRC connection reconfiguration complete message received from the UE to the CU,
   wherein:
   the CU includes one CU-control plane (CU-CP) and a plurality of CU-user planes (CU-UPs); and
   the source DU and the target DU are connected to the same CU-CP through an E1 interface.

2. The method of claim 1, wherein:
   the base station includes the CU and a plurality of DUs;
   the CU is a logical node hosting a RRC layer, a service data adaptation protocol (SDAP) layer, and a packet data convergence protocol (PDCP) layer; and
   the DUs are logical nodes hosting a radio link control (RLC) layer, a media access control (MAC) layer, and a physical (PHY) layer.

3. The method of claim 1, wherein the UE context modification request message includes stop indication information to instruct the source DU to stop data transmission for the UE.

4. The method of claim 3, wherein, when the stop indication information is received, the source DU sends downlink data delivery status frame information, which includes information about downlink data not transmitted to the UE, to the CU.

5. The method of claim 4, wherein the CU sends the downlink data not transmitted to the UE to the target DU.

6. The method of claim 1, wherein the UE context setup request message includes identifier information (CU UE F1AP ID) for identifying a UE connection over an F1 interface within the CU.

7. The method of claim 1, wherein the UE context setup response message includes identifier information (CU UE F1AP ID) for identifying a UE connection over an F1 interface within the CU and identifier information (DU UE F1AP ID) for identifying a UE connection over the F1 interface within the DU.

8. The method of claim 1, further comprising, after the forwarding of the RRC connection reconfiguration complete message,
   sending, by the CU, a UE context release command message to the source DU; and releasing, by the source DU, a UE context and sending a UE context release complete message to the CU.

9. The method of claim 8, wherein each of the UE context release command message and the UE context release complete message includes:
   identifier information (CU UE F1AP ID) for identifying a UE connection over an F1 interface within the CU; and
   identifier information (DU UE F1AP ID) for identifying a UE connection over the F1 interface within the DU.

10. The method of claim 1, wherein:
   the CU includes one CU-CP and a plurality of CU-UPs; and
   the source DU and the target DU are connected to different CU-UPs through an E1 interface.

11. The method of claim 10, wherein the CU-CP:
   sends a bearer context modification request message to the CU-UP connected to the source DU and the CU-UP connected to the target DU; and
   receives bearer context modification response messages from the CU-UP connected to the source DU and the CU-UP connected to the target DU.

12. The method of claim 11, wherein each of the bearer context modification request message and the bearer context modification response message includes:
   identifier information (CU-CP UE E1AP ID) for identifying a UE connection over the E1 interface within the CU-CP; and
   identifier information (CU-UP UE E1AP ID) for identifying a UE connection over the E1 interface within each of the CU-UPs.

13. A base station for controlling mobility of user equipment (UE), the base station comprising:
   a receiver configured to receive a measurement report from a UE through a source distributed unit (DU);
   a controller configured to, when determination is made to control mobility of the UE according to the measurement report, control a central unit (CU) to send a UE context setup request message to a target DU to create a UE context and set a bearer up, control the target DU to send a UE context setup response message to the CU to inform the CU of completion of creating a UE context and setting up the bearer, and control the CU to send a UE context modification request message including a radio resource control (RRC) connection reconfiguration message to the source DU; and
   a transmitter configured to send the RRC connection reconfiguration message to the UE through the source DU,
   wherein the target DU performs a random access procedure with the UE and forwards an RRC connection reconfiguration complete message received from the UE to the CU, and
   wherein:
   the CU includes one CU-control plane (CU-CP) and a plurality of CU-user planes (CU-UPs); and
   the source DU and the target DU are connected to different CU-UPs through an E1 interface.

14. The base station of claim 13, wherein the UE context modification request message includes stop indication information to instruct the source DU to stop data transmission for the UE.

15. The base station of claim 14, wherein, when the stop indication information is received, the source DU sends downlink data delivery status frame information, which includes information about downlink data not transmitted to the UE, to the CU.

16. The base station of claim 13, wherein the UE context setup request message includes identifier information (CU UE F1AP ID) for identifying a UE connection over an F1 interface within the CU.

17. The base station of claim 13, wherein, when the RRC connection reconfiguration complete message is forwarded to the CU, the controller:
   controls the CU to send a UE context release command message to the source DU;
   controls the source DU to release a UE context according to the UE context release command message; and
   send a UE context release complete message to the CU.

18. The base station of claim 13, wherein the CU-CP:
   sends a bearer context modification request message to the CU-UP connected to the source DU and the CU-UP connected to the target DU; and
   receives bearer context modification response messages from the CU-UP connected to the source DU and the CU-UP connected to the target DU.

\* \* \* \* \*